US008615952B2

(12) United States Patent
Engstrom

(10) Patent No.: US 8,615,952 B2
(45) Date of Patent: Dec. 31, 2013

(54) SET OF PANELS COMPRISING RETAINING PROFILES WITH A SEPARATE CLIP AND METHOD FOR INSERTING THE CLIP

(75) Inventor: Nils-Erik Engstrom, Trelleborg (SE)

(73) Assignee: Pergo (Europe) AB, Trelleborg (SE)

( * ) Notice: Subject to any disclaimer, the term of this patent is extended or adjusted under 35 U.S.C. 154(b) by 0 days.

(21) Appl. No.: 12/966,797

(22) Filed: Dec. 13, 2010

(65) Prior Publication Data

US 2011/0173914 A1 Jul. 21, 2011

(30) Foreign Application Priority Data

Jan. 15, 2010 (DE) .......................... 10 2010 004 717

(51) Int. Cl.
*E04B 2/00* (2006.01)

(52) U.S. Cl.
USPC ............................. 52/582.2; 52/489.2; 52/769

(58) Field of Classification Search
USPC ............ 52/489.1, 489.2, 582.2, 591.4, 591.5, 52/586.1, 586.2, 768, 769
See application file for complete search history.

(56) References Cited

U.S. PATENT DOCUMENTS

| 208,036 | A | 9/1878 | Robley |
|---|---|---|---|
| 213,740 | A | 4/1879 | Conner |
| 308,313 | A | 11/1884 | Gerike |
| 342,529 | A | 5/1886 | McRae |
| 662,458 | A | 11/1900 | Nagel |
| 714,987 | A | 12/1902 | Wolfe |
| 752,694 | A | 2/1904 | Lund |
| 753,791 | A | 3/1904 | Fulghum |
| 769,355 | A | 9/1904 | Platow |
| 832,003 | A | 9/1906 | Torrence |
| 847,272 | A | 3/1907 | Ayers |
| 877,639 | A | 1/1908 | Galbraith |
| 898,381 | A | 9/1908 | Mattison |
| 1,000,859 | A | 8/1911 | Vaughan |
| 1,002,102 | A | 8/1911 | Weedon |

(Continued)

FOREIGN PATENT DOCUMENTS

| AU | 199732569 | 12/1999 |
|---|---|---|
| AU | 2000020703 | 6/2000 |

(Continued)

OTHER PUBLICATIONS

Non-final Office Action for U.S. Appl. No. 12/747,454 dated Aug. 6, 2012.

(Continued)

*Primary Examiner* — Jeanette E Chapman
*Assistant Examiner* — Daniel Kenny
(74) *Attorney, Agent, or Firm* — Jenkins, Wilson, Taylor & Hunt, P.A.

(57) ABSTRACT

The invention relates to a set of panels, preferably of floor panels, consisting of a first panel and at least a second panel with, in each case, a top side and an underside, wherein the first panel comprises at an edge a first retaining profile with a hook directed towards the top side, the second panel comprises at an edge a second retaining profile with a hook directed towards the underside, the first retaining profile and the second retaining profile can be connected by a relative movement directed perpendicular to a plane of laying, and wherein a separate clip is provided, which comprises a clip head, a clip body and a clip base. Moreover, the invention relates to a method for inserting the clip into a retaining profile.

9 Claims, 3 Drawing Sheets

(56) References Cited

U.S. PATENT DOCUMENTS

Figure 1:
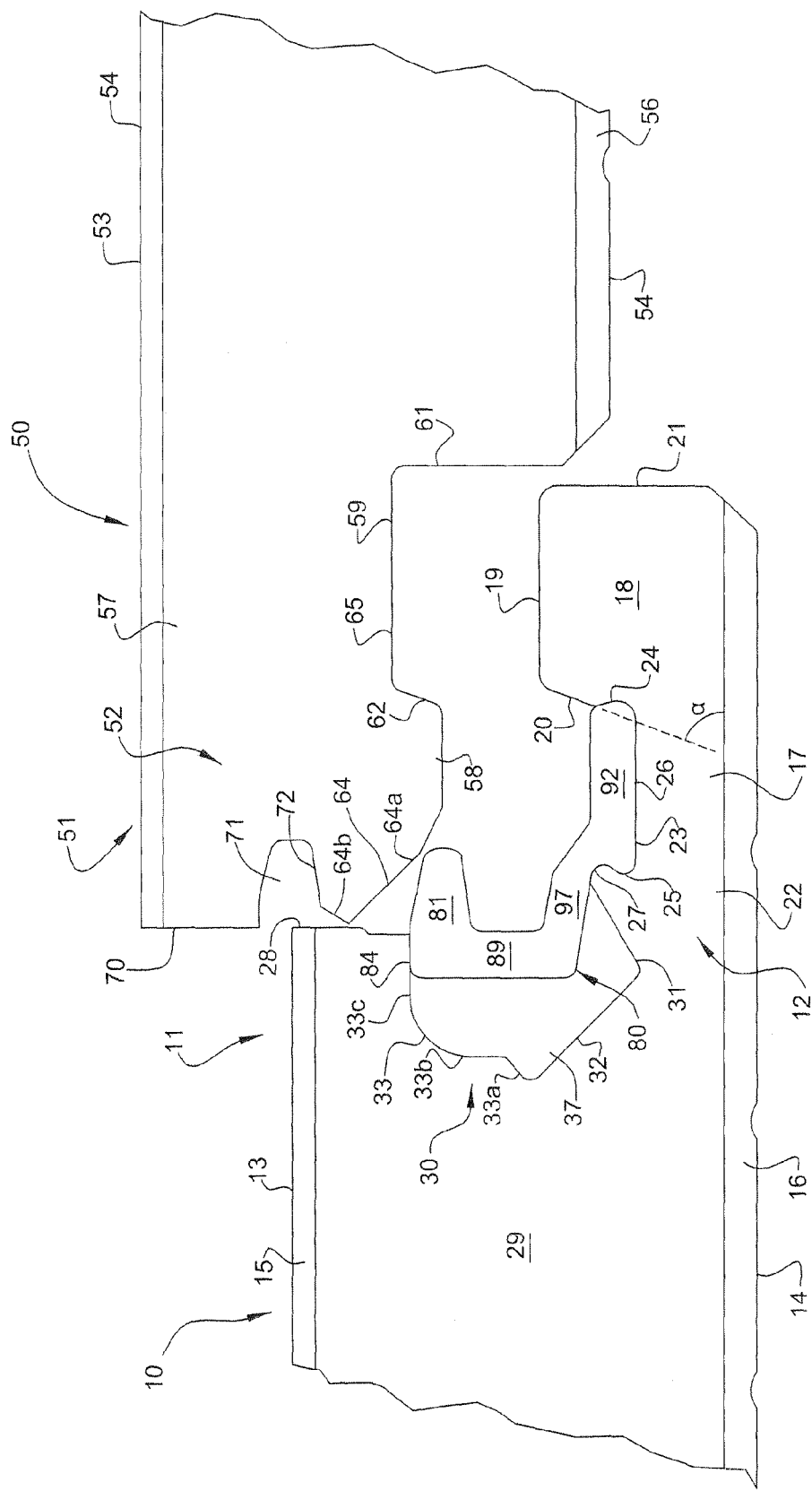

| Patent No. | Date | Name |
|---|---|---|
| 1,016,383 A | 2/1912 | Wellman |
| 1,097,986 A | 5/1914 | Moritz |
| 1,124,226 A | 1/1915 | Houston |
| 1,124,228 A | 1/1915 | Houston |
| 1,137,197 A | 4/1915 | Ellis |
| 1,140,958 A | 5/1915 | Cowan |
| 1,266,253 A | 5/1918 | Hakason |
| 1,319,286 A | 10/1919 | Johnson et al. |
| 1,357,713 A | 11/1920 | Lane |
| 1,407,679 A | 2/1922 | Ruchrauff |
| 1,454,250 A | 5/1923 | Parsons |
| 1,468,288 A | 9/1923 | Fen |
| 1,510,924 A | 10/1924 | Daniels et al. |
| 1,540,128 A | 6/1925 | Houston |
| 1,575,821 A | 3/1926 | Daniels |
| 1,576,527 A | 3/1926 | McBride |
| 1,576,821 A | 3/1926 | Daniels |
| 1,602,256 A | 10/1926 | Sellin |
| 1,602,267 A | 10/1926 | Karwisde |
| 1,615,096 A | 1/1927 | Myers |
| 1,622,103 A | 3/1927 | Fulton |
| 1,622,104 A | 3/1927 | Fulton |
| 1,637,634 A | 8/1927 | Carter |
| 1,644,710 A | 10/1927 | Crooks |
| 1,657,159 A | 1/1928 | Greenebaum |
| 1,660,480 A | 2/1928 | Daniels |
| 1,706,924 A | 3/1929 | Kane |
| 1,714,738 A | 5/1929 | Smith |
| 1,718,702 A | 6/1929 | Pfiester |
| 1,734,826 A | 11/1929 | Pick |
| 1,736,539 A | 11/1929 | Lachman |
| 1,764,331 A | 6/1930 | Moratz |
| 1,772,417 A | 8/1930 | Ellinwood |
| 1,776,188 A | 9/1930 | Langbaum |
| 1,823,039 A | 9/1930 | Gruner |
| 1,778,069 A | 10/1930 | Fetz |
| 1,787,027 A | 12/1930 | Wasleff |
| 1,801,093 A | 4/1931 | Larkins |
| 1,843,024 A | 1/1932 | Werner |
| 1,854,396 A | 4/1932 | Davis |
| 1,859,667 A | 5/1932 | Gruner |
| 1,898,364 A | 2/1933 | Gynn |
| 1,906,411 A | 5/1933 | Potvin |
| 1,913,342 A | 6/1933 | Schaffert |
| 1,929,871 A | 10/1933 | Jones |
| 1,940,377 A | 12/1933 | Storm |
| 1,953,306 A | 4/1934 | Moratz |
| 1,966,020 A | 7/1934 | Rowley |
| 1,978,075 A | 10/1934 | Butterworth |
| 1,986,739 A | 1/1935 | Mitte |
| 1,988,201 A | 1/1935 | Hall |
| 1,991,701 A | 2/1935 | Roman |
| 2,004,193 A | 6/1935 | Cherry |
| 2,015,813 A | 10/1935 | Nielsen |
| 2,027,292 A | 1/1936 | Rockwell |
| 2,044,216 A | 6/1936 | Klages |
| 2,045,067 A | 6/1936 | Bruce |
| 2,049,571 A | 8/1936 | Schuck |
| 2,100,238 A | 11/1937 | Burgess |
| 2,126,956 A | 8/1938 | Gilbert |
| 2,138,085 A | 11/1938 | Birtles |
| 2,141,708 A | 12/1938 | Elmendorf |
| 2,142,305 A | 1/1939 | Davis |
| 2,194,086 A | 3/1940 | Horn |
| 2,199,938 A | 5/1940 | Kloote |
| 2,222,137 A | 11/1940 | Bruce |
| 2,238,169 A | 4/1941 | Heyn et al. |
| 2,245,497 A | 6/1941 | Potchen |
| 2,253,943 A | 8/1941 | Rice |
| 2,266,464 A | 12/1941 | Kraft |
| 2,276,071 A | 3/1942 | Scull |
| 2,280,071 A | 4/1942 | Hamilton |
| 2,282,559 A | 5/1942 | Byers |
| 2,324,628 A | 7/1943 | Kahr |
| 2,363,429 A | 11/1944 | Lowry |
| 2,398,632 A | 4/1946 | Frost et al. |
| 2,405,602 A | 8/1946 | Nugent |
| 2,430,200 A | 11/1947 | Wilson |
| 2,487,571 A | 11/1949 | Maxwell |
| 2,491,498 A | 12/1949 | Kahr |
| 2,644,552 A | 7/1953 | MacDonald |
| 2,717,420 A | 9/1955 | Georges |
| 2,729,584 A | 1/1956 | Foster |
| 2,740,167 A | 4/1956 | Rowley |
| 2,780,253 A | 2/1957 | Joa |
| 2,808,624 A | 10/1957 | Sullivan |
| 2,823,433 A | 2/1958 | Kendall |
| 2,839,790 A | 6/1958 | Collings |
| 2,857,302 A | 10/1958 | Burton et al. |
| 2,863,185 A | 12/1958 | Reidi |
| 2,865,058 A | 12/1958 | Andersson et al. |
| 2,878,530 A | 3/1959 | Hilding |
| 2,894,292 A | 7/1959 | Gramelspacher |
| 2,926,401 A | 3/1960 | Place |
| 2,831,223 A | 9/1960 | DeShazor |
| 2,952,341 A | 9/1960 | Weiler |
| 2,996,751 A | 8/1961 | Roby |
| 3,045,294 A | 7/1962 | Livezey, Jr. |
| 3,090,082 A | 5/1963 | Bauman |
| 3,100,556 A | 8/1963 | Ridder |
| 3,125,138 A | 3/1964 | Bolenbach |
| 3,128,851 A | 4/1964 | Deridder et al. |
| 3,141,392 A | 7/1964 | Schneider |
| 3,148,482 A | 9/1964 | Neale |
| 3,162,906 A | 12/1964 | Dudley |
| 3,182,769 A | 5/1965 | De Ridder |
| 3,199,258 A | 8/1965 | Jentoft et al. |
| 3,203,149 A | 8/1965 | Soddy |
| 3,204,380 A | 9/1965 | Wilson |
| 3,253,377 A | 5/1966 | Schakel |
| 3,257,225 A | 6/1966 | Marotta |
| 3,267,630 A | 8/1966 | Omholt |
| 3,282,010 A | 11/1966 | King, Jr. |
| 3,286,425 A | 11/1966 | Brown |
| 3,296,056 A | 1/1967 | Bechtold |
| 3,301,147 A | 1/1967 | Aluminum |
| 3,310,919 A | 3/1967 | Bue |
| 3,331,171 A | 7/1967 | Hallock |
| 3,339,329 A | 9/1967 | Berg |
| 3,347,048 A | 10/1967 | Brown et al. |
| 3,362,127 A | 1/1968 | McGowan |
| 3,363,381 A | 1/1968 | Forrest |
| 3,363,382 A | 1/1968 | Forrest |
| 3,363,383 A | 1/1968 | La Barge |
| 3,373,071 A | 3/1968 | Fuerst |
| 3,377,931 A | 4/1968 | Hilton |
| 3,387,422 A | 6/1968 | Wanzer |
| 3,397,496 A | 8/1968 | Sohns |
| 3,444,660 A | 5/1969 | Feichter |
| 3,449,879 A | 6/1969 | Bloom |
| 3,460,304 A | 8/1969 | Braeuninger et al. |
| 3,473,278 A | 10/1969 | Gossen |
| 3,474,584 A | 10/1969 | Lynch |
| 3,479,784 A | 11/1969 | Massagli |
| 3,481,810 A | 12/1969 | Waite |
| 3,488,828 A | 1/1970 | Gallagher |
| 3,496,119 A | 2/1970 | Fitzgerald |
| 3,508,369 A | 4/1970 | Tennison |
| 3,526,420 A | 9/1970 | Brancaleone |
| 3,535,844 A | 10/1970 | Glaros |
| 3,538,665 A | 11/1970 | Gohner |
| 3,538,819 A | 11/1970 | Gould et al. |
| 3,553,919 A | 1/1971 | Omholt |
| 3,555,762 A | 1/1971 | Costanzo, Jr. |
| 3,570,205 A | 3/1971 | Payne |
| 3,572,224 A | 3/1971 | Perry |
| 3,579,941 A | 5/1971 | Tibbals |
| 3,619,964 A | 11/1971 | Passaro et al. |
| 3,627,362 A | 12/1971 | Brenneman |
| 3,657,852 A | 4/1972 | Worthington et al. |
| 3,665,666 A | 5/1972 | Delcroix |
| 3,671,369 A | 6/1972 | Kvalheim et al. |
| 3,687,773 A | 8/1972 | Wangborg |
| 3,694,983 A | 10/1972 | Couquet |

(56) References Cited

U.S. PATENT DOCUMENTS

| | | |
|---|---|---|
| 3,696,575 A | 10/1972 | Armstrong |
| 3,707,061 A | 12/1972 | Collette et al. |
| 3,714,747 A | 2/1973 | Curran |
| 3,720,027 A | 3/1973 | Christensen |
| 3,731,445 A | 5/1973 | Hoffmann et al. |
| 3,745,726 A | 7/1973 | Thom |
| 3,758,650 A | 9/1973 | Hurst |
| 3,759,007 A | 9/1973 | Thiele |
| 3,760,544 A | 9/1973 | Hawes et al. |
| 3,768,846 A | 10/1973 | Hensley et al. |
| 3,778,958 A | 12/1973 | Fowler |
| 3,798,111 A | 3/1974 | Lane et al. |
| 3,807,113 A | 4/1974 | Turner |
| 3,808,030 A | 4/1974 | Bell |
| 3,810,707 A | 5/1974 | Tungseth et al. |
| 3,849,240 A | 11/1974 | Mikulak |
| 3,859,000 A | 1/1975 | Webster |
| 3,884,328 A | 5/1975 | Williams |
| 3,902,293 A | 9/1975 | Witt et al. |
| 3,908,053 A | 9/1975 | Hettich |
| 3,908,062 A | 9/1975 | Roberts |
| 3,921,312 A | 11/1975 | Fuller |
| 3,936,551 A | 2/1976 | Elmendorf et al. |
| 3,953,661 A | 4/1976 | Gulley |
| 3,988,187 A | 10/1976 | Witt et al. |
| 4,059,933 A | 11/1977 | Funk et al. |
| 4,060,437 A | 11/1977 | Strout |
| 4,065,902 A | 1/1978 | Lindal |
| 4,067,155 A | 1/1978 | Ruff et al. |
| 4,074,496 A | 2/1978 | Fischer |
| 4,090,338 A | 5/1978 | Bourgade |
| 4,099,358 A | 7/1978 | Compaan |
| 4,144,689 A | 3/1979 | Bains |
| 4,150,517 A | 4/1979 | Warner |
| 4,158,335 A | 6/1979 | Belcastro |
| 4,164,832 A | 8/1979 | Van Zandt |
| 4,169,688 A | 10/1979 | Toshio |
| 4,186,539 A | 2/1980 | Harmon et al. |
| 4,198,455 A | 4/1980 | Spiro et al. |
| 4,242,390 A | 12/1980 | Nemeth |
| 4,247,390 A | 1/1981 | Knoll |
| 4,292,774 A | 10/1981 | Mairle |
| 4,299,070 A | 11/1981 | Oltmanns et al. |
| 4,316,351 A | 2/1982 | Ting |
| 4,376,593 A | 3/1983 | Schaefer |
| 4,390,580 A | 6/1983 | Donovan et al. |
| 4,426,820 A | 1/1984 | Terbrack et al. |
| 4,449,346 A | 5/1984 | Tremblay |
| 4,455,803 A | 6/1984 | Kornberger |
| 4,461,131 A | 7/1984 | Pressell |
| 4,471,012 A | 9/1984 | Maxwell |
| 4,501,102 A | 2/1985 | Knowles |
| 4,504,347 A | 3/1985 | Munk et al. |
| 4,505,887 A | 3/1985 | Miyata et al. |
| 4,520,062 A | 5/1985 | Ungar et al. |
| 4,561,233 A | 12/1985 | Harter et al. |
| 4,571,910 A | 2/1986 | Cosentino |
| 4,594,347 A | 6/1986 | Ishikawa et al. |
| 4,599,124 A | 7/1986 | Kelly et al. |
| 4,599,841 A | 7/1986 | Haid |
| 4,599,842 A | 7/1986 | Counihan |
| 4,612,745 A | 9/1986 | Hovde |
| 4,621,471 A | 11/1986 | Kuhr et al. |
| 4,641,469 A | 2/1987 | Wood |
| 4,643,237 A | 2/1987 | Rosa |
| 4,653,138 A | 3/1987 | Carder |
| 4,653,242 A | 3/1987 | Ezard |
| 4,672,728 A | 6/1987 | Nimberger |
| 4,683,631 A | 8/1987 | Dobbertin |
| 4,703,597 A | 11/1987 | Eggemar |
| 4,715,162 A | 12/1987 | Brightwell |
| 4,733,510 A | 3/1988 | Werner |
| 4,736,563 A | 4/1988 | Bilhorn |
| 4,738,071 A | 4/1988 | Ezard |
| 4,747,197 A | 5/1988 | Charron |
| 4,754,658 A | 7/1988 | Gutknecht |
| 4,757,657 A | 7/1988 | Mitchell |
| 4,757,658 A | 7/1988 | Kaempen |
| 4,769,963 A | 9/1988 | Meyerson |
| 4,796,402 A | 1/1989 | Pajala |
| 4,806,435 A | 2/1989 | Athey |
| 4,819,932 A | 4/1989 | Trotter, Jr. |
| 4,819,935 A | 4/1989 | Dirksing et al. |
| 4,831,806 A | 5/1989 | Niese et al. |
| 4,844,972 A | 7/1989 | Tedeschi et al. |
| 4,845,907 A | 7/1989 | Meek |
| 4,893,449 A | 1/1990 | Kemper |
| 4,894,272 A | 1/1990 | Aisley |
| 4,905,442 A | 3/1990 | Daniels |
| 4,910,280 A | 3/1990 | Robbins, III |
| 4,920,626 A | 5/1990 | Nimberger |
| 4,940,503 A | 7/1990 | Lindgren et al. |
| 4,952,775 A | 8/1990 | Yokoyama et al. |
| 4,953,335 A | 9/1990 | Kawaguchi et al. |
| 4,988,131 A | 1/1991 | Wilson et al. |
| 4,998,395 A | 3/1991 | Bezner |
| 4,998,396 A | 3/1991 | Palmersten |
| 5,003,016 A | 3/1991 | Boeder |
| 5,029,425 A | 7/1991 | Bogataj |
| 5,034,272 A | 7/1991 | Lindgren et al. |
| 5,050,362 A | 9/1991 | Tal et al. |
| 5,070,662 A | 12/1991 | Niese |
| 5,074,089 A | 12/1991 | Kemmer et al. |
| 5,086,599 A | 2/1992 | Meyerson |
| 5,092,095 A | 3/1992 | Zadok |
| 5,113,632 A | 5/1992 | Hanson |
| 5,117,603 A | 6/1992 | Weintraub |
| 5,138,812 A | 8/1992 | Palmersten |
| 5,148,850 A | 9/1992 | Urbanick |
| 5,155,952 A | 10/1992 | Herwegh et al. |
| 5,165,816 A | 11/1992 | Parasin |
| 5,179,811 A | 1/1993 | Walker et al. |
| 5,179,812 A | 1/1993 | Hill |
| 5,216,861 A | 6/1993 | Meyerson |
| 5,244,303 A | 9/1993 | Hair |
| 5,247,773 A | 9/1993 | Weir |
| 5,253,464 A | 10/1993 | Nilsen |
| 5,259,162 A | 11/1993 | Nicholas |
| 5,271,564 A | 12/1993 | Smith |
| 5,274,979 A | 1/1994 | Tsai |
| 5,292,155 A | 3/1994 | Bell et al. |
| 5,295,341 A | 3/1994 | Kajiwara |
| 5,325,649 A | 7/1994 | Kajiwara |
| 5,343,665 A | 9/1994 | Palmersten |
| 5,344,700 A | 9/1994 | McGath et al. |
| 5,348,778 A | 9/1994 | Knipp et al. |
| 5,349,796 A | 9/1994 | Meyerson |
| 5,359,817 A | 11/1994 | Fulton |
| 5,365,713 A | 11/1994 | Nicholas et al. |
| 5,390,457 A | 2/1995 | Sjolander |
| 5,424,118 A | 6/1995 | McLaughlin |
| 5,433,048 A | 7/1995 | Strasser |
| 5,433,806 A | 7/1995 | Pasquali et al. |
| 5,474,831 A | 12/1995 | Nystrom |
| 5,497,589 A | 3/1996 | Porter |
| 5,502,939 A | 4/1996 | Zadok et al. |
| 5,527,128 A | 6/1996 | Rope et al. |
| 5,540,025 A | 7/1996 | Takehara et al. |
| D373,203 S | 8/1996 | Kornfalt |
| 5,567,497 A | 10/1996 | Zegler et al. |
| 5,570,554 A | 11/1996 | Searer |
| 5,581,967 A | 12/1996 | Glatz |
| 5,597,024 A | 1/1997 | Bolyard et al. |
| 5,618,602 A | 4/1997 | Nelson |
| 5,618,612 A | 4/1997 | Gstrein |
| 5,623,799 A | 4/1997 | Kowalski |
| 5,630,304 A | 5/1997 | Austin |
| 5,657,598 A | 8/1997 | Wilbs et al. |
| 5,671,575 A | 9/1997 | Wu |
| 5,685,117 A | 11/1997 | Nicholson |
| 5,688,569 A | 11/1997 | Gilmore et al. |
| 5,692,354 A | 12/1997 | Searer |
| 5,695,875 A | 12/1997 | Larsson et al. |
| 5,706,621 A | 1/1998 | Pervan |

(56) References Cited

U.S. PATENT DOCUMENTS

| | | |
|---|---|---|
| 5,706,623 A | 1/1998 | Brown |
| 5,719,239 A | 2/1998 | Mirous et al. |
| 5,735,092 A | 4/1998 | Clayton et al. |
| 5,736,227 A | 4/1998 | Sweet et al. |
| 5,765,808 A | 6/1998 | Butschbacher et al. |
| 5,791,114 A | 8/1998 | Mandel |
| 5,797,237 A | 8/1998 | Finkell, Jr. |
| 5,823,240 A | 10/1998 | Bolyard et al. |
| 5,827,592 A | 10/1998 | Van Gulik et al. |
| 5,860,267 A | 1/1999 | Pervan |
| 5,888,017 A | 3/1999 | Corrie |
| 5,894,701 A | 4/1999 | Delorme |
| 5,904,019 A | 5/1999 | Kooij et al. |
| 5,907,934 A | 6/1999 | Austin |
| 5,930,947 A | 8/1999 | Eckhoff |
| 5,931,447 A | 8/1999 | Butschbacher et al. |
| 5,935,668 A | 8/1999 | Smith |
| 5,941,047 A | 8/1999 | Johansson |
| 5,943,239 A | 8/1999 | Shamblin et al. |
| 5,945,181 A | 8/1999 | Fisher |
| 5,950,389 A | 9/1999 | Porter |
| 5,968,625 A | 10/1999 | Hudson |
| 5,971,655 A | 10/1999 | Shirakawa |
| 5,987,839 A | 11/1999 | Hamar et al. |
| 5,987,845 A | 11/1999 | Laronde |
| 5,996,301 A | 12/1999 | Conterno |
| 6,006,486 A | 12/1999 | Moriau et al. |
| 6,012,263 A | 1/2000 | Church et al. |
| 6,021,615 A | 2/2000 | Brown |
| 6,023,907 A | 2/2000 | Pervan |
| 6,029,416 A | 2/2000 | Andersson |
| 6,079,182 A | 6/2000 | Ellenberger |
| 6,094,882 A | 8/2000 | Pervan |
| 6,101,778 A | 8/2000 | Martensson |
| 6,119,423 A | 9/2000 | Costantino |
| 6,134,854 A | 10/2000 | Stanchfield |
| 6,141,920 A | 11/2000 | Kemper |
| 6,148,884 A | 11/2000 | Bolyard et al. |
| 6,158,915 A | 12/2000 | Kise |
| 6,182,410 B1 | 2/2001 | Pervan |
| 6,182,413 B1 | 2/2001 | Magnusson |
| 6,189,283 B1 | 2/2001 | Bentley |
| 6,205,639 B1 | 3/2001 | Pervan |
| 6,209,278 B1 | 4/2001 | Tychsen |
| 6,216,403 B1 | 4/2001 | Belbeoc'h |
| 6,216,409 B1 | 4/2001 | Roy et al. |
| 6,219,982 B1 | 4/2001 | Eyring |
| 6,230,385 B1 | 5/2001 | Nelson |
| 6,233,899 B1 | 5/2001 | Mellert et al. |
| 6,247,285 B1 | 6/2001 | Moebus |
| 6,253,514 B1 | 7/2001 | Jobe et al. |
| 6,314,701 B1 | 11/2001 | Meyerson |
| 6,324,803 B1 | 12/2001 | Pervan |
| 6,324,809 B1 | 12/2001 | Nelson |
| 6,332,733 B1 | 12/2001 | Hamberger et al. |
| 6,345,480 B1 | 2/2002 | Kemper |
| 6,345,481 B1 | 2/2002 | Nelson |
| 6,363,677 B1 | 4/2002 | Chen et al. |
| 6,365,258 B1 | 4/2002 | Alm |
| 6,365,936 B1 | 4/2002 | Shimabukuro et al. |
| 6,385,936 B1 | 5/2002 | Schneider |
| 6,397,547 B1 | 6/2002 | Martensson |
| 6,418,683 B1 | 7/2002 | Martensson et al. |
| 6,421,970 B1 | 7/2002 | Martensson et al. |
| 6,423,257 B1 | 7/2002 | Stobart |
| 6,438,919 B1 | 8/2002 | Knauseder |
| 6,446,405 B1 | 9/2002 | Pervan |
| 6,505,452 B1 | 1/2003 | Hannig et al. |
| 6,510,665 B2 | 1/2003 | Pervan |
| 6,516,579 B1 | 2/2003 | Pervan |
| 6,517,935 B1 | 2/2003 | Kornfalt et al. |
| 6,532,709 B2 | 3/2003 | Pervan |
| 6,536,178 B1 | 3/2003 | Palsson |
| 6,550,205 B2 | 4/2003 | Neuhofer |
| 6,588,165 B1 | 7/2003 | Wright |
| 6,588,166 B2 | 7/2003 | Martensson et al. |
| 6,591,568 B1 | 7/2003 | Pålsson |
| 6,601,359 B2 | 8/2003 | Olofsson |
| 6,606,834 B2 | 8/2003 | Martensson et al. |
| 6,647,690 B1 | 11/2003 | Martensson |
| 6,672,030 B2 | 1/2004 | Schulte |
| 6,682,254 B1 | 1/2004 | Olofsson |
| 6,711,869 B2 | 3/2004 | Tychsen |
| 6,729,091 B1 | 5/2004 | Martensson |
| 6,745,534 B2 | 6/2004 | Kornfalt |
| 6,763,643 B1 | 7/2004 | Martensson |
| 6,769,219 B2 | 8/2004 | Schwitte et al. |
| 6,769,835 B2 | 8/2004 | Stridsman |
| 6,786,016 B1 | 9/2004 | Wood |
| 6,805,951 B2 | 10/2004 | Kornfalt et al. |
| 6,851,241 B2 | 2/2005 | Pervan |
| 6,854,235 B2 | 2/2005 | Martensson |
| 6,860,074 B2 | 3/2005 | Stanchfield |
| 6,880,305 B2 | 4/2005 | Pervan et al. |
| 6,880,307 B2 | 4/2005 | Schwitte et al. |
| 6,898,913 B2 | 5/2005 | Pervan |
| 6,920,732 B2 | 7/2005 | Martensson |
| 6,931,798 B1 | 8/2005 | Pocai |
| 6,966,161 B2 | 11/2005 | Palsson et al. |
| RE38,950 E | 1/2006 | Maiers et al. |
| 7,015,227 B2 | 3/2006 | Darrow et al. |
| 7,021,019 B2 | 4/2006 | Knauseder |
| 7,086,205 B2 | 8/2006 | Pervan |
| 7,121,058 B2 | 10/2006 | Palsson et al. |
| 7,121,059 B2 | 10/2006 | Pervan |
| 7,131,242 B2 | 11/2006 | Martensson |
| 7,152,507 B2 | 12/2006 | Solari |
| 7,210,272 B2 | 5/2007 | Friday |
| 7,332,053 B2 | 2/2008 | Palsson et al. |
| 7,347,328 B2 | 3/2008 | Hartwall |
| 7,398,628 B2 | 7/2008 | Van Horne |
| 7,441,385 B2 | 10/2008 | Palsson et al. |
| 7,451,578 B2 | 11/2008 | Hannig |
| 7,497,058 B2 | 3/2009 | Martensson |
| 7,552,568 B2 | 6/2009 | Palsson et al. |
| 7,603,826 B1 | 10/2009 | Moebus |
| 7,634,884 B2 | 12/2009 | Pervan et al. |
| 7,726,088 B2 * | 6/2010 | Muehlebach ............... 52/582.1 |
| 7,856,784 B2 | 12/2010 | Martensson |
| 7,877,956 B2 | 2/2011 | Martensson |
| 7,980,039 B2 * | 7/2011 | Groeke et al. ............... 52/582.2 |
| 7,980,043 B2 | 7/2011 | Moebus |
| 8,028,486 B2 | 10/2011 | Pervan et al. |
| 8,037,657 B2 | 10/2011 | Sjoberg et al. |
| 8,038,363 B2 | 10/2011 | Hannig et al. |
| 8,117,795 B2 | 2/2012 | Knauseder |
| 8,234,834 B2 | 8/2012 | Martensson et al. |
| 8,276,342 B2 | 10/2012 | Martensson |
| 8,402,709 B2 | 3/2013 | Martensson |
| 2001/0029720 A1 | 10/2001 | Pervan |
| 2002/0007608 A1 | 1/2002 | Pervan |
| 2002/0046526 A1 | 4/2002 | Knauseder |
| 2002/0046528 A1 | 4/2002 | Pervan et al. |
| 2002/0095895 A1 | 7/2002 | Daly et al. |
| 2002/0100242 A1 | 8/2002 | Olofsson |
| 2002/0112433 A1 | 8/2002 | Pervan |
| 2002/0127374 A1 | 9/2002 | Spratling |
| 2002/0148551 A1 | 10/2002 | Knauseder |
| 2002/0178573 A1 | 12/2002 | Oike et al. |
| 2002/0178674 A1 | 12/2002 | Pervan |
| 2002/0178681 A1 | 12/2002 | Zancai et al. |
| 2002/0178682 A1 | 12/2002 | Pervan |
| 2002/0189747 A1 | 12/2002 | Steinwender |
| 2003/0009972 A1 | 1/2003 | Pervan et al. |
| 2003/0024199 A1 | 2/2003 | Pervan et al. |
| 2003/0033784 A1 | 2/2003 | Pervan |
| 2003/0084634 A1 | 5/2003 | Stanchfield |
| 2003/0084636 A1 | 5/2003 | Pervan |
| 2003/0094230 A1 | 5/2003 | Sjoberg |
| 2003/0118812 A1 | 6/2003 | Kornfalt |
| 2003/0141004 A1 | 7/2003 | Palmblad |
| 2003/0145540 A1 | 8/2003 | Brunedal |
| 2003/0154678 A1 | 8/2003 | Stanchfield |
| 2003/0159389 A1 | 8/2003 | Kornfalt |

(56) References Cited

U.S. PATENT DOCUMENTS

| | | | |
|---|---|---|---|
| 2004/0016197 | A1 | 1/2004 | Ruhdorfer |
| 2004/0031225 | A1 | 2/2004 | Fowler |
| 2004/0031226 | A1 | 2/2004 | Miller |
| 2004/0031227 | A1 | 2/2004 | Knauseder |
| 2004/0040235 | A1 | 3/2004 | Kurtz |
| 2004/0041225 | A1 | 3/2004 | Nemoto |
| 2004/0139678 | A1 | 7/2004 | Pervan |
| 2004/0182036 | A1 | 9/2004 | Sjoberg et al. |
| 2004/0191461 | A1 | 9/2004 | Riccobene |
| 2004/0211143 | A1 | 10/2004 | Hanning |
| 2005/0034405 | A1 | 2/2005 | Pervan |
| 2005/0166526 | A1 | 8/2005 | Stanchfield |
| 2005/0210810 | A1 | 9/2005 | Pervan |
| 2005/0252130 | A1 | 11/2005 | Martensson |
| 2006/0101769 | A1 | 5/2006 | Pervan |
| 2006/0236642 | A1 | 10/2006 | Pervan |
| 2006/0248836 | A1 | 11/2006 | Martensson |
| 2007/0006543 | A1 | 1/2007 | Engstrom |
| 2007/0028547 | A1 | 2/2007 | Grafenauer et al. |
| 2007/0240376 | A1 | 10/2007 | Engstrom |
| 2008/0000286 | A1 | 1/2008 | Strohmaier et al. |
| 2008/0134613 | A1 | 6/2008 | Pervan |
| 2008/0216434 | A1 | 9/2008 | Pervan |
| 2008/0236088 | A1 | 10/2008 | Hannig |
| 2008/0271403 | A1 | 11/2008 | Palsson |
| 2009/0019806 | A1 | 1/2009 | Muehlebach |
| 2009/0064624 | A1 | 3/2009 | Sokol |
| 2009/0100782 | A1 | 4/2009 | Groeke et al. |
| 2009/0193748 | A1 | 8/2009 | Boo et al. |
| 2009/0199500 | A1 | 8/2009 | LeBlang |
| 2009/0217615 | A1 | 9/2009 | Engstrom |
| 2010/0031599 | A1 | 2/2010 | Kennedy et al. |
| 2010/0043333 | A1 | 2/2010 | Hannig |
| 2010/0058700 | A1 | 3/2010 | LeBlang |
| 2011/0167751 | A1 | 7/2011 | Engstrom |
| 2011/0271631 | A1 | 11/2011 | Engstrom |
| 2011/0271632 | A1* | 11/2011 | Cappelle et al. ............ 52/582.2 |
| 2011/0293361 | A1 | 12/2011 | Olofsson |
| 2012/0042595 | A1 | 2/2012 | De Boe |
| 2012/0055112 | A1 | 3/2012 | Engstrom |
| 2012/0216472 | A1 | 8/2012 | Martensson et al. |
| 2012/0233948 | A1 | 9/2012 | Palsson |
| 2012/0247053 | A1 | 10/2012 | Martensson |
| 2012/0291396 | A1 | 11/2012 | Martensson |
| 2012/0304590 | A1 | 12/2012 | Engstrom |
| 2013/0042555 | A1 | 2/2013 | Martensson |

FOREIGN PATENT DOCUMENTS

| | | |
|---|---|---|
| BE | 417526 | 12/1936 |
| BE | 557844 | 3/1960 |
| BE | 1010339 | 6/1998 |
| BE | 1010487 | 10/1998 |
| CA | 9971373 | 6/1976 |
| CA | 1169106 | 6/1984 |
| CA | 2226286 | 12/1997 |
| CA | 2252791 | 5/1999 |
| CA | 2289309 | 11/1999 |
| CH | 200949 | 1/1939 |
| CH | 211677 | 1/1941 |
| CH | 211877 | 1/1941 |
| DE | 209979 | 11/1906 |
| DE | 1212275 | 3/1966 |
| DE | 1985418 | 5/1968 |
| DE | 1534802 | 4/1970 |
| DE | 7102476 | 6/1971 |
| DE | 1534278 | 11/1971 |
| DE | 2101782 | 7/1972 |
| DE | 2145024 | 3/1973 |
| DE | 2159042 | 6/1973 |
| DE | 2238660 | 2/1974 |
| DE | 2251762 | 5/1974 |
| DE | 7402354 | 5/1974 |
| DE | 2502992 | 7/1976 |
| DE | 2616077 | 10/1977 |
| DE | 2917025 | 11/1980 |
| DE | 3104519 | 2/1981 |
| DE | 3041781 | 6/1982 |
| DE | 3214207 | 11/1982 |
| DE | 3246376 | 6/1984 |
| DE | 3304992 | 8/1984 |
| DE | 3306609 | 9/1984 |
| DE | 3319235 | 11/1984 |
| DE | 3343601 | 6/1985 |
| DE | 8604004 | 4/1986 |
| DE | 3512204 | 10/1986 |
| DE | 3544845 | 6/1987 |
| DE | 3631390 | 12/1987 |
| DE | 3640822 | 6/1988 |
| DE | 8600241 | 4/1989 |
| DE | 4002547-0 | 8/1991 |
| DE | 3932980 | 11/1991 |
| DE | 9300306 | 3/1993 |
| DE | 4134452 | 4/1993 |
| DE | 4215273 | 11/1993 |
| DE | 4242530 | 6/1994 |
| DE | 9317191 | 3/1995 |
| DE | 29703962 | 6/1997 |
| DE | 29710175 | 8/1997 |
| DE | 29711960 | 10/1997 |
| DE | 19651149 | 6/1998 |
| DE | 19709641 | 9/1998 |
| DE | 19821938 | 11/1999 |
| DE | 20001225 | 7/2000 |
| DE | 19925248 | 12/2000 |
| DE | 20018284 | 1/2001 |
| DE | 20017461 | 2/2001 |
| DE | 20027461 | 3/2001 |
| DE | 517353 | 5/2002 |
| DE | 10062873 | 7/2002 |
| DE | 10131248 | 1/2003 |
| DE | 10 2007 035 648 A1 | 1/2009 |
| DE | 2009 022 483.1 | 5/2009 |
| DE | 20 2009 004 530 U1 | 7/2009 |
| DE | 10 2009 038 750 A1 | 3/2011 |
| DE | 10 2005 002 297.9 | 5/2012 |
| EP | 0085196 | 8/1983 |
| EP | 0248127 | 12/1987 |
| EP | 0220389 | 5/1992 |
| EP | 0623724 | 11/1994 |
| EP | 0652340 | 5/1995 |
| EP | 0698162 | 2/1996 |
| EP | 000711886 | 5/1996 |
| EP | 0843763 | 5/1998 |
| EP | 0849416 | 6/1998 |
| EP | 0855482 | 7/1998 |
| EP | 0877130 | 11/1998 |
| EP | 0903451 | 3/1999 |
| EP | 0958441 | 11/1999 |
| EP | 0969163 | 1/2000 |
| EP | 0969164 | 1/2000 |
| EP | 0974713 | 1/2000 |
| EP | 1229181 | 8/2002 |
| EP | 2400076 | 8/2004 |
| EP | 2 034 106 | 3/2009 |
| FI | 843060 | 8/1984 |
| FR | 557844 | 8/1923 |
| FR | 1175582 | 3/1959 |
| FR | 1215852 | 4/1960 |
| FR | 1293043 | 5/1962 |
| FR | 2568295 | 1/1986 |
| FR | 2630149 | 10/1989 |
| FR | 2637932 | 4/1990 |
| FR | 2675174 | 10/1992 |
| FR | 2691491 | 11/1993 |
| FR | 2691691 | 11/1993 |
| FR | 2891491 | 11/1993 |
| FR | 2697275 | 4/1994 |
| FR | 2712329 | 5/1995 |
| FR | 2781513 | 1/2000 |
| FR | 2785633 | 5/2000 |
| FR | 2810060 | 12/2001 |
| GB | 424057 | 2/1935 |

(56) References Cited

FOREIGN PATENT DOCUMENTS

| | | |
|---|---|---|
| GB | 585205 | 1/1947 |
| GB | 599793 | 3/1948 |
| GB | 636423 | 4/1950 |
| GB | 812671 | 4/1959 |
| GB | 1212983 | 11/1970 |
| GB | 1237744 | 6/1971 |
| GB | 1348272 | 3/1974 |
| GB | 1430423 | 3/1976 |
| GB | 2117813 | 10/1983 |
| GB | 2126106 | 3/1984 |
| GB | 2142670 | 1/1985 |
| GB | 2168732 | 6/1986 |
| GB | 2228753 | 9/1990 |
| GB | 2243381 | 10/1991 |
| GB | 2256023 | 11/1992 |
| IT | 812671 | 4/1959 |
| JP | 5465528 | 5/1979 |
| JP | 57119056 | 7/1982 |
| JP | 64-14839 | 1/1989 |
| JP | 1178659 | 7/1989 |
| JP | 02285145 | 11/1990 |
| JP | 3-18343 | 2/1991 |
| JP | 3-44645 | 4/1991 |
| JP | 3046645 | 4/1991 |
| JP | 3169967 | 7/1991 |
| JP | 4106264 | 4/1992 |
| JP | 4191001 | 7/1992 |
| JP | 514984 | 6/1993 |
| JP | 6-146553 | 5/1994 |
| JP | 656310 | 8/1994 |
| JP | 6320510 | 11/1994 |
| JP | 752103 | 2/1995 |
| JP | 407052103 | 2/1995 |
| JP | 7076923 | 3/1995 |
| JP | 7180333 | 7/1995 |
| JP | 7229276 | 8/1995 |
| JP | 7279366 | 10/1995 |
| JP | 7310426 | 11/1995 |
| JP | 8086078 | 4/1996 |
| JP | 7300979 | 11/1999 |
| NL | 7601773 | 2/1975 |
| NO | 157871 | 7/1984 |
| NO | 305614 | 5/1995 |
| PL | 26931 | 6/1989 |
| SE | 372051 | 12/1974 |
| SE | 7114900-9 | 12/1974 |
| SE | 7706470 | 12/1978 |
| SE | 450141 | 6/1987 |
| SE | 8206934-5 | 6/1987 |
| SE | 457737 | 1/1989 |
| SE | 462809 | 4/1990 |
| SE | 467150 | 6/1992 |
| SE | 501014 | 10/1994 |
| SE | 9301595-6 | 10/1994 |
| SE | 502994 | 3/1996 |
| SE | 503861 | 9/1996 |
| SE | 509059 | 11/1998 |
| SE | 509060 | 11/1998 |
| SE | 512290 | 2/2000 |
| SE | 512313 | 2/2000 |
| SE | 513189 | 7/2000 |
| SE | 514645 | 3/2001 |
| SU | 363795 | 11/1973 |
| WO | WO 80/02155 | 10/1980 |
| WO | WO 84/02155 | 6/1984 |
| WO | WO 8703839 | 7/1987 |
| WO | WO 9217657 | 10/1992 |
| WO | WO 93/13280 | 7/1993 |
| WO | WO 9401628 | 1/1994 |
| WO | WO 9426999 | 11/1994 |
| WO | WO 96/12857 | 5/1996 |
| WO | WO 9623942 | 8/1996 |
| WO | WO 9627719 | 9/1996 |
| WO | WO 9627721 | 9/1996 |
| WO | WO 9630177 | 10/1996 |
| WO | WO 9747834 | 12/1997 |
| WO | WO 9822678 | 5/1998 |
| WO | WO 9824994 | 6/1998 |
| WO | WO 9824995 | 6/1998 |
| WO | WO 9858142 | 12/1998 |
| WO | WO 9901628 | 1/1999 |
| WO | WO 9940273 | 8/1999 |
| WO | WO 9966151 | 12/1999 |
| WO | WO 9966152 | 12/1999 |
| WO | WO 0002214 | 1/2000 |
| WO | WO 0006854 | 2/2000 |
| WO | WO 00/20705 | 4/2000 |
| WO | WO 00/47841 | 8/2000 |
| WO | WO 0056802 | 9/2000 |
| WO | WO 0063510 | 10/2000 |
| WO | WO 0066856 | 11/2000 |
| WO | WO 0120101 | 3/2001 |
| WO | WO 01/31141 | 5/2001 |
| WO | WO 2007/089186 | 8/2002 |
| WO | WO 02/081843 | 10/2002 |
| WO | WO 03/083234 | 10/2003 |
| WO | WO 03093686 | 11/2003 |
| WO | WO 2005/040521 | 5/2005 |
| WO | WO 2005/054599 | 6/2005 |
| WO | WO 2005/059269 | 6/2005 |
| WO | WO 2006/043893 | 4/2006 |
| WO | WO 2007/008139 | 1/2007 |
| WO | WO 2008/004960 | 1/2008 |
| WO | WO 2008/068245 | 6/2008 |
| WO | WO 2009/066153 A2 | 5/2009 |
| WO | WO 2009/139687 A1 | 11/2009 |
| WO | WO 2010/082171 | 1/2010 |
| WO | PCT/EP10/03167 | 5/2010 |
| WO | WO 2010/136171 A1 | 12/2010 |
| WO | WO 2011/085788 A1 | 7/2011 |

OTHER PUBLICATIONS

Knight's American Mechanical Dictionary, vol. IIII, 1876, definition of "scarf".

Traditional Details; For Building Restoration, Renovation, and Rehabilitation: From the 1932-1951 Editions of Architectvral Graphic Standards; John Wiley & Sons, Inc.

Traindustrins Handbok "Snickeriarbete", Knut Larsson, Tekno's Handbocker Publikation 12-11 (1952).

Elements of Rolling Practice; The United Steel Companies Limited Sheffiel, England, 1963; pp. 116-117.

Die mobile; Terbrack; 1968.

High-Production Roll Forming; Society of Manufacturing Engineers Marketing Services Depmiment; pp. 189-192; George T. Halmos; 1983.

Fundamentals of Building Construction Materials and Methods; Copyright 1985; pp. 11.

Automated Program of Designing Snap-fits; Aug. 1987; pp. 3.

Plastic Part Technology; 1991; pp. 161-162.

Technoscope; Modern Plastics, Aug. 1991; pp. 29-30.

Encyclopedia of Wood Joints; A Fine Woodworking Book; pp. 1-151; 1992.

Whittington's Dictionary of Plastics; Edited by James F. Carley, Ph.D., PE; pp. 443, 461; 1993.

Patent Mit Inter-nationalem, Die Revolution ((von Grund auf)) Fibo-Trespo, Disstributed at the Domotex fair in Hannover, Germany in Jan. 1996.

Wood Handbook; Forest Products Laboratory, 1999; "Glossary pp. G-1 to 0-14", "Chapter 10, pp. 10-1 to 10-31".

Focus, Information Till Ana Medabetare, Jan. 2001, Kahrs pa Domotex I Hmmover, Tyskim 1d, Jan. 13-16, 2001.

Search Report dated Apr. 21, 2001.

Letter to the USPTO dated May 14, 2002, regarding U.S. Appl. No. 90/005,744.

Non-Final Office Action for U.S. Appl. No. 10/270,163 dated Dec. 10, 2004.

Final Office Action for U.S. Appl. No. 10/270,163 dated Jun. 2, 2005.

Non-Final Office Action for U.S. Appl. No. 10/270,163 dated Dec. 14, 2005.

(56) References Cited

OTHER PUBLICATIONS

Final Office Action for U.S. Appl. No. 10/270,163 dated May 25, 2006.
Non-Final Office Action for U.S. Appl. No. 11/185,724 dated Sep. 26, 2006.
Non-Final Office Action for U.S. Appl. No. 11/483,636 dated Oct. 11, 2006.
Reexamination No. 90/007,366 dated Oct. 24, 2006.
Reexamination No. 90/007,526 dated Dec. 5, 2006.
Non-Final Office Action for U.S. Appl. No. 11/185,724 dated Apr. 19, 2007.
Non-Final Office Action for U.S. Appl. No. 11/483,636 dated Apr. 19, 2007.
Non-Final Office Action for U.S. Appl. No. 11/015,741 dated Sep. 6, 2007.
Non-Final Office Action for U.S. Appl. No. 11/242,127 dated Nov. 1, 2007.
Non-Final Office Action for U.S. Appl. No. 11/185,724 dated Jan. 9, 2008.
Final Office Action for U.S. Appl. No. 11/015,741 dated Feb. 26, 2008.
Non-Final Office Action for U.S. Appl. No. 11/483,636 dated Apr. 3, 2008.
Non-Final Office Action for U.S. Appl. No. 11/242,127 dated Apr. 29, 2008.
United States District Court Eastern District of Wisconsin; Order; Dated May 1, 2008.
Examiner Interview Summary for U.S. Appl. No. 11/015,741 dated May 7, 2008.
Final Office Action for U.S. Appl. No. 11/185,724 dated Jul. 9, 2008.
Non-Final Office Action for U.S. Appl. No. 10/580,191 dated Jul. 16, 2008.
Reexamination No. 90/007,365 dated Aug. 5, 2008.
United States District Court Eastern District of Wisconsin; Judgment; Dated Oct. 10, 2008.
United States District Court Eastern District of Wisconsin; Order; Dated Oct. 10, 2008.
Final Office Action for U.S. Appl. No. 11/483,636 dated Nov. 20, 2008.
United States District Court Eastern District of Wisconsin; Order; Dated Dec. 31, 2008.
Non-Final Office Action for U.S. Appl. No. 11/242,127 dated Mar. 31, 2009.
Non-Final Office Action for U.S. Appl. No. 12/010,587 dated Jun. 23, 2009.
Non-Final Office Action for U.S. Appl. No. 11/483,636 dated Jul. 21, 2009.
Examiner Interview Summary for U.S. Appl. No. 11/185,724 dated Aug. 13, 2009.
Non-Final Office Action for U.S. Appl. No. 12/278,274 dated Sep. 24, 2009.
Final Office Action for U.S. Appl. No. 11/242,127 dated Nov. 24, 2009.
United States Court of Appeals for Federal Circuit; 2009-1107,-1122; Decided: Feb. 18, 2010.
Appeals from the United States District Court for the Eastern District of Wisconsin; Consolidated case No. 02.
Non-Final Office Action for U.S. Appl. No. 10/580,191 dated Mar. 10, 2010.
Non-Final Office Action for U.S. Appl. No. 11/483,636 dated Mar. 17, 2010.
United States Court of Appeals of the Federal Circuit; Case No. 02-CV-0736 and 03-CV-616; Mandate issued on Apr. 12, 2010; Judgment; 2 pages.
Final Office Action for U.S. Appl. No. 12/278,274 dated May 17, 2010.
Final Office Action for U.S. Appl. No. 12/010,587 dated May 25, 2010.
Final Office Action for U.S. Appl. No. 10/580,191 dated Oct. 6, 2010.
Non-Final Office Action for U.S. Appl. No. 12/278,274 dated Nov. 2, 2010.
Non-Final Office Action for U.S. Appl. No. 11/483,636 dated Dec. 7, 2010.
Non-Final Office Action for U.S. Appl. No. 12/010,587 dated Mar. 16, 2011.
Final Office Action for U.S. Appl. No. 12/278,274 dated Apr. 14, 2011.
Final Office Action for U.S. Appl. No. 11/483,636 dated May 24, 2011.
Non-Final Office Action for U.S. Appl. No. 13/048,646 dated May 25, 2011.
Non-Final Office Action for U.S. Appl. No. 12/966,861 dated Jul. 20, 2011.
Non-Final Office Action for U.S. Appl. No. 12/979,086 dated Aug. 3, 2011.
Non-Final Office Action for U.S. Appl. No. 12/010,587 dated Aug. 30, 2011.
Non-Final Office Action for U.S. Appl. No. 11/483,636 dated Sep. 28, 2011.
Decision revoking the European Patent EP-B-1 276 941 dated Oct. 21, 2011.
Final Office Action for U.S. Appl. No. 13/048,646 dated Nov. 1, 2011.
Final Office Action for U.S. Appl. No. 12/966,861 dated Jan. 20, 2012.
Final Office Action for U.S. Appl. No. 12/979,086 dated Jan. 25, 2012.
Final Office Action for U.S. Appl. No. 11/483,636 dated Feb. 7, 2012.
Final Office Action for U.S. Appl. No. 13/204,481 dated Mar. 12, 2012.
Notice of Allowance for U.S. Appl. No. 12/966,861 dated Apr. 11, 2012.
Non-Final Office Action for U.S. Appl. No. 13/437,597 dated Jul. 9, 2012.
Notice of Allowance for U.S. Appl. No. 12/979,086 dated Jul. 19, 2012.
Non-Final Office Action for U.S. Appl. No. 13/452,183 dated Aug. 8, 2012.
Non-Final Office Action for U.S. Appl. No. 13/204,481 dated Sep. 7, 2012.
Non-Final Office Action for U.S. Appl. No. 13/567,933 dated Sep. 12, 2012.
Non-Final Office Action for U.S. Appl. No. 11/483,636 dated Oct. 10, 2012.
European Office Action dated Oct. 19, 2012.
Notice of Allowance for U.S. Appl. No. 13/437,597 dated Oct. 26, 2012.
Non-Final Office Action for U.S. Appl. No. 13/086,931 dated Nov. 7, 2012.
Non-Final Office Action for U.S. Appl. No. 13/492,512 dated Nov. 21, 2012.
Non-Final Office Action for U.S. Appl. No. 13/463,329 dated Nov. 21, 2012.
Notice of Allowance for U.S. Appl. No. 11/483,636 dated Nov. 23, 2012.
Notice of Allowance for U.S. Appl. No. 10/270,163 dated Dec. 13, 2012.
Non-Final Office Action for U.S. Appl. No. 13/559,230 dated Dec. 20, 2012.
Non-Final Office Action for U.S. Appl. No. 13/675,936 dated Dec. 31, 2012.
Notice of Allowability for U.S. Appl. No. 11/483,636 dated Jan. 3, 2013.
Notice of Allowance for U.S. Appl. No. 12/747,454 dated Jan. 8, 2013.
Notice of Allowance for U.S. Appl. No. 13/437,597 dated Jan. 9, 2013.
Final Office Action for U.S. Appl. No. 12/010,587 dated Jan. 28, 2013.
Non-Final Office Action for U.S. Appl. No. 13/620,098 dated Feb. 8, 2013.

(56) References Cited

OTHER PUBLICATIONS

Final Office Action for U.S. Appl. No. 13/204,481 dated Feb. 25, 2013.
Non-Final Office Action for U.S. Appl. No. 13/492,512 dated Feb. 26, 2013.
Non-Final Office Action for U.S. Appl. No. 11/015,741 dated Mar. 13, 2013.
Final Office Action for U.S. Appl. No. 13/567,933 dated Mar. 15, 2013.
Architectvral Graphic Standards; Jolm Wiley & Sons, Inc.
Bojlesystemet til Junckers boliggulve, Junckers Trae for Livet.
CLIC, Ali-Nr, 110 11 640.
Fibolic Brochure, undated.
Fiboloc Literature, Mar. 1999.
FN Neuhofer Holz, "Profiles in various kinds and innovative accessories"; Certified according to DIN EN ISO 9002.
Haro Wand und Decke.
Hot Rolling of Steel; Library of Congress Cataloging in Publication Data; Roberts, William L; p. 189.
International Search Report.
Laminat-Boden, Clever-Clickq.
New Software Simplifies Snap-Fit Design; Design News; p. 148.
Opplaering OG Autorisasjon, Fibo-Trespo, ALLOC, Lmninatgulvet som Legges Uter Lin.
Original Pergo the Free and Easy Floor.
Pergo, Clic Flooring, Laminatgolv.
Plastic Product Design; Van Nostrand Reinhold Company; pp. 256-258.
Special Verdict, Civil Case No. 02-C-0736.
The Clip System for Junckers Sports Floors, Junckers Solid Hardood Flooring, Almex 7, p. 1/2.
The Clip System for Junckers Sports Floors, Junckers Solid Hardood Flooring, Annex 8, p. 1/4.
Time Life Books; "Floors, Stairs, Carpets," p. 14.
Trabearbetning Anders Gronhmd, TralelmikCentrum.
Trae Pjecer; pp. 1-35.
United States District Court Eastern of Wisconsin; Pervan Testimony; Trial Day 5 (Official Transcript); pp. 1101-1292.
United States District Court North Carolina; *Pergo (Europe) AB* v. *Unilin Beheer BV*, Civil. Action No. 5:08-CV-91; Joint Stipulation of Dismissal.
United States District District Court of North Carolina; *Pergo (Europe) AB* v. *Unilin Beheer BV.* Civil Action No. 5:08-CV-91-H3; Plaintiffs Original Complaint for Patent Infringement.
United States District District Court of North Carolina; *Pergo (Europe) Ab* v. *Unilin Beheer BV.* Civil Action No. 5:08-CV-91-H3; Answer and Counterclaim of Defendant.
Valinge Innovation AB; "Choosing the Locking System".
Webster's, Dictionary, p. 862, definition of "scarf".
Notice of Allowance for U.S. Appl. No. 11/242,127 dated Apr. 26, 2013.
Notice of Allowance for U.S. Appl. No. 13/437,597 dated Apr. 29, 2013.
Non-Final Office Action for U.S. Appl. No. 12/747,454 dated May 10, 2013.
Notice of Allowance for U.S. Appl. No. 11/185,724 dated May 20, 2013.

\* cited by examiner

SET OF PANELS COMPRISING RETAINING PROFILES WITH A SEPARATE CLIP AND METHOD FOR INSERTING THE CLIP

The invention relates to a set of panels, preferably of floor panels, consisting of a first panel and at least a second panel with, in each case, a top side and an underside, wherein the first panel comprises at an edge a first retaining profile with a hook directed towards the top side, the second panel comprises at an edge a second retaining profile with a hook directed towards the underside, the first retaining profile and the second retaining profile can be connected by a relative movement directed perpendicular to a plane of laying, and wherein a separate clip is provided, which comprises a clip head, a clip body and a clip base. Moreover, the invention relates to a method for inserting the clip into a retaining profile.

WO2007/008139 discloses such a set of panels with a separate clip, wherein the hooks, in the connected state of the retaining profiles, provide for a positive fit in the direction parallel to the plane of laying, and the clip provides for a positive fit in the direction perpendicular to the plane of laying. During the relative movement of the retaining profiles, that is, when the retaining profiles are joined into one another, the clip head executes a closing rotary movement substantially about an axis of rotation oriented parallel to the edges. Due to this rotary movement, the clip head reaches a locking position in which it fixes or locks the two retaining profiles in the direction perpendicular to the plane of laying. Prior to this rotary movement, the clip, at least with the clip head and the clip body, is lodged in a clip groove. The rotary movement of the clip head is in this case initiated by the clip base being pressed towards the underside when the retaining profiles are joined into one another. The clip thus absorbs deformation energy due to which the clip head is moved out from the clip groove into the locking position.

The rotary movement of the rotary head into the locking position is opposed by friction forces, which are especially large when the clip is lodged in the clip groove with a certain press fit. If the press fit is set too tightly, it may be that the clip head does not snap into its locking position, in spite of the absorbed deformation energy, but that it is stuck in the clip groove. If, however, the fit of the clip in the clip groove is set to be too loose, then there is a risk that the clip falls out of the clip groove inadvertently during transport or laying of the panels.

The invention is therefore based on the object of providing a set of panels which comprise retaining profiles with a separate clip, and which are simple and reliable to handle and lay. Furthermore, the invention is based on the object of being able to insert the separate clip into a retaining profile of a panel in a simple manner.

The objects on which the invention is based are achieved with the subject matters of claims 1 and 9. Preferred exemplary embodiments are apparent from the dependent claims.

The set of panels according to claim 1 is characterized in that the clip base is firmly connected with the first retaining profile in a laying position of the clip, and that the clip has a deformation region between the clip body and the clip base, wherein the clip head, during the relative movement of the retaining profiles, is pressed by the second retaining profile into a clip evasion groove of the first retaining profile, in the process executing at first an opening rotary movement opposite to the closing or locking rotary movement. In contrast to WO2007/008139, the closing rotary movement of the clip head is thus not initiated by any pressure from the first retaining profile on the clip base. The clip base is firmly connected with the first retaining profile in the laying position of the clip. The laying position of the clip in this case is the position which the clip assumes prior to the retaining profiles being connected with each other by a relative movement perpendicular to the plane of laying. Preferably, the laying position is set already during the manufacturing process at the plant, i.e., before the panels are delivered to the dealers and customers.

Preferably, the clip head and clip body form a rigid unit which is substantially not deformed in comparison with the deformation region during the insertion of the clip. Whereas the clip base is preferably disposed in a lower half of the first panel, the clip head is preferably disposed in a lower half. Thus, the clip body extends between the upper and the lower half and can have a length that corresponds to about a third of the thickness (distance between top side and underside) of the first panel.

The first retaining profile can have a rotation support for the deformation region which defines an axis of rotation for the closing and locking rotary movement of the clip head. It should be noted that, when the retaining profiles are joined into one another, the clip head executes a reciprocating movement which may not correspond exactly to a rotary movement in each case. For example, the movement of the rotary head may also comprise translational components. Preferably, the rotation support has a rounded portion along which the deformation region rolls off, which leads to a rotary movement of the clip head spaced from the deformation region.

In a preferred exemplary embodiment, the clip base is lodged in a clip base groove open towards the top side. This clip base groove is provided in the first retaining profile. According to the invention, it is in this case provided that the clip base is firmly lodged in the clip base groove.

There are several options for connecting the clip base firmly with the first retaining profile. For example, the clip base can be glued to the first retaining profile. If the clip base is lodged in a clip base groove, a groove side wall of the clip base groove can have an undercut which cooperates with an end of the clip base, preferably with an outer end of the clip base. In this case, the effect of the undercut is that it is not possible, or only possible by exerting a certain force, to move the clip base out from the clip base groove. In the case of a clip base groove open towards the top side, the undercut acts in the direction of the top side. In the case of floor panels, the undercut would thus act in the vertical direction, that is, it would render a withdrawal of the clip base vertically in the direction of the top side difficult or impossible.

The rotation support can be an upper end of an inner groove side wall of the clip base groove. The rotation support can also be disposed at a distance from the inner groove side wall of the clip base groove. The inner groove side wall can also have an undercut, which ensures that the clip base is lodged firmly in the clip base groove. The undercut or the undercuts can be designed such that the clip base snaps into the clip base groove.

In a preferred exemplary embodiment, the clip evasion groove has a groove clearance space in which the clip head and the clip body are lodged when the clip is in a intermediate insertion position, in which the clip base is not located in the clip base groove, or protrudes from it at least partially. Thus, a distinction must be made between the intermediate insertion position on the one hand and the laying position of the clip on the other hand. Expediently, the panels are delivered and distributed to retailers with the separate clip in the laying position. Thus, the intermediate insertion position of the clip is preferably a position which the clip assumes intermediately during insertion of the separate clip into the first retaining profile. During the manufacture of the panels, the clip can only be in the intermediate insertion position for a very short time.

The rotation support can substantially define an axis of rotation about which the clip can be rotated in order to transfer the clip from the intermediate insertion position into the laying position. Thus, the rotation support on the one hand defines the axis of rotation for the clip head, which arrives in the locking position by an at first opening rotary movement and a subsequent locking rotary movement when the retaining profiles are connected with each other as the panels a laid. On the other hand, the rotation support defines the same axis of rotation about which the clip moves from the intermediate insertion position into the laying position.

Since the clip, in the laying position, is firmly connected with the first retaining profile via the clip base, clamping the clip and thus also the clip head in the clip groove or the clip evasion groove so that it does not fall out of the clip groove inadvertently can be dispensed with. Thus, the retaining profiles and the clip can be designed so that, when the retaining profiles are connected, the clip head reaches its locking position simply and safely and provides for the corresponding lock of the retaining profiles perpendicular to the plane of laying. Preferably, the clip head, in the locking position, is lodged in a locking groove of the second retaining profile.

The inventive method according to claim 9 serves for inserting a separate clip into a first retaining profile of a first panel comprising a top side, an underside and an edge on which the first retaining profile is disposed. In this case, the first retaining profile has a hook directed towards the top side, which serves for establishing a positive-fit connection in the direction parallel to the top side with a hook of a second retaining profile on an edge of the second panel when the retaining profiles are connected with each other. The first retaining profile is designed to be capable of being connected with the second retaining profile by a relative movement between the retaining profiles directed perpendicular to the top side. The clip to be inserted comprises a clip head, a clip body and a clip base, as well as a deformation region between the clip body and the clip base. The first retaining profile comprises a rotation support on which the deformation region rests in a laying position of the clip, with the rotation support defining an axis of rotation about which the clip substantially rotates when the retaining profiles are connected with each other.

The method according to the invention for inserting the clip is characterized in that the clip is at first brought into an intermediate insertion position in which the clip base is not lodged in a clip base groove or protrudes from it at least partially, and that, independent from connecting the first retaining profile with the second retaining profile, the clip is brought, by a rotation about the axis of rotation, from the intermediate insertion position into the laying position in which the clip base is firmly connected with the first retaining profile. Thus, the insertion of the clip into the first retaining profile proceeds in two stages. In the first stage, the clip is brought into the intermediate insertion position. Thence, the clip is moved into the laying position in the second stage.

Preferably, the movement of the clip into the intermediate insertion position is of a translational nature. This means that this movement is mainly linear, even though it may also have small components of a rotational movement.

The translational or substantially translational movement of the clip into the intermediate insertion position can include an angle to the top side of the first panel which amounts to 25° to 50°. A range of between 30° and 40° has proved to be a suitable range of the angle of the translational movement relative to the top side. In a particularly preferred embodiment, the angle is about 35°.

The rotation of the clip from the intermediate insertion position into the laying position is preferably caused by pressure on the clip base. It may be remarked here that the movement of the clip from the intermediate insertion position into the laying position is supposed to correspond substantially to a rotary movement. Thus, the movement of the clip may also comprise translational components.

Pressure on the clip base can be brought about by a roller or other pressure tool. Preferably, the roller or pressure tool is fixed in its position, with the first panel then passing the roller or pressure tool during its manufacture. However, it is also possible that the roller or the pressure tool are configured so as to be moveable.

In a preferred exemplary embodiment, the clip head and the clip body are disposed in a groove clearance space of a clip evasion groove of the first retaining profile in the intermediate insertion position, with the clip head and clip body not arriving in the groove clearance space any more when the clip base is firmly connected with the first retaining profile. Thus, the groove clearance space merely serves for providing the clip head and the clip body with a space during the insertion of the clip into the first retaining profile. If a clip is in its laying position, which it preferably is when the panel is delivered to the dealers after production is completed, the groove clearance space is not required anymore. It may be expedient to design the clip and the first retaining profile in such a way that an intended removal of the clip from the retaining profile is carried out by the clip being pressed from the laying position into the intermediate insertion position, in order to then be drawn from this intermediate insertion position from the first retaining profile in a preferably translational movement.

Fastening means can be provided which retain the clip head and the clip body in the groove clearance space when the clip is in the intermediate insertion position. These fastening means can comprise glue and/or a press fit. The fastening means can comprise individual projections or the like, which preferably do not extend over the entire length of the clip, but are formed at a certain distance in the longitudinal direction relative to the clip. These projections, together with the clip evasion groove, can effect a press fit so that the clip is securely lodged in the intermediate insertion position.

The invention is explained in more detail with reference to the exemplary embodiments shown in the figures. In the figures:

FIG. 1: shows a first and a second panel comprising retaining profiles;

FIG. 2: shows the panels of FIG. 1 in different positions relative to each other; and FIG. 3 schematically shows a method for inserting a separate clip into one of the retaining profiles.

FIG. 1 shows a part of the first panel marked with the reference numeral 10. Moreover, FIG. 1 shows a part of a second panel 50. The first panel 10 comprises an edge 11 extending in the plane of the illustration in FIG. 1. The first panel 10 can have a rectangular basic shape, or also a different polygonal shape. In this case, the edge 11 represents an edge of the rectangle or of the polygon. The edge 11 and the edge 51 can be opposite or adjacent edges of only a single panel. Panel 10 and panel 50 are preferably constructionally identical.

The first panel 10 has a top side 13 and an underside 14. A decorative layer 15, which can be constructed of several layers and comprise, for example, a decorative layer and an overlay, is disposed on the top side 13. In turn, the overlay can be constructed of several layers, for example in the form of a middle impregnated cellulose layer and an upper and a lower resin layer enriched with hard particles in order to ensure a certain abrasion and scratch resistance of the top side 13. These hard particles can be, for example, corundum with an average grain size of 1 µm to 150 µm. The upper layer of the overlay can in this case preferably comprise finer corundum with average grain sizes of between 1 µm and 20 µm, whereas the lower layer comprises coarser corundum with a with average grain sizes of between 20 µm and 150 µm.

A compensation layer 16 is disposed on the underside. It serves for absorbing tensions in the first panel which could be caused by the decorative layer 15 on the top side 13 of the first panel 10. A core 29, which can consist of various materials, is provided between the decorative layer 15 and the compensation layer 16. MDF or HDF are preferred materials. The core 29 can also consist of plastic or composite materials containing proportions of wood, plastics, glass fiber and/or carbon fibers.

A first retaining profile 12 comprising a hook 17 with a hook offset section 18 is provided on the edge 11. The hook offset section 18 comprises an offset section top side 19 adjoined on an outer end by an offset section end face 21. An offset section locking surface 20 is provided on the inner end of the offset section top side 19. The offset section locking surface 20 is inclined at an angle α relative to the underside 14 (or to the top side 13 parallel to the underside 14). In the exemplary embodiment shown here, the angle α is 70°. However, it can also assume values <70° and also values >70°. In this case, it is possible, in principle, to have the offset section locking surface extend perpendicularly to the underside 14, so that in that case, the angle α would be 90°.

A clip 80 comprising a clip head 81, a clip body 89 and a clip base 92 is connected with the first retaining profile 12. The clip body 89 constitutes a connection between the clip head 81 and the clip base 92, with a deformation region 97 of the clip 80 being provided between the clip body 89 and the clip base 92.

The clip base 92 is firmly lodged in a clip base groove 23 limited by an outer groove side wall 24, an inner groove side wall 25 and a groove bottom 26. The clip base groove 23 is open towards the top side 13. The groove side walls 24, 25 have an undercut which ensures that the clip base 92 cannot be drawn out from the clip base groove 26 in the direction of the top side 13. The undercut of the outer groove side wall 24 can have an angle, relative to the underside 14, of 75° to 85°.

The inner groove side wall 25 merges into a rounded-off rotation support 27. With the deformation region 97, the clip 80 in this case 80 rests against the rotation support 27.

In the position which is referred to as a laying position, the clip is at least partially disposed in a clip evasion groove. The clip evasion groove 30 has a lower groove side wall 31, a groove rear wall 32, as well as an upper groove side wall 33. In this case, the upper groove side wall has different sections. A first section 33a adjoins the groove rear wall 32 at a substantially right angle. The first section 33a is followed by a second section 33b, which has the approximate shape of a quarter circle. This second section 33b then merges into the third section 33c, against which the clip head 81 rests with a top side 84 of the head. The third section 33c substantially extends parallel to the top side 13.

The second panel 50 is substantially identical to the first panel 10 as regards its construction. Thus, it also comprises a top side 53 and an underside 54, with a decorative layer 54 being provided on the top side 53 and a compensation layer 56 being provided on the underside 54. A second retaining profile 52 configured such that, in the connected state, it cooperates with the first retaining profile 12 for locking the panels 10, 50, is provided at an edge 51 of the second panel 50, which connects the top side 53 with the underside 54. The second retaining profile 52 comprises a hook 57 with a hook offset section 58 and a hook groove 59. The hook groove 59 is limited by an inner groove side wall 61 and an outer groove side wall 62. The inner groove side wall 62 may also be referred to as offset section locking surface, which cooperates with the offset section locking surface 20 of the first retaining profile when the retaining profiles 12, 52 are connected with each other. Just as the offset section locking surface 20, the inner groove side wall 62 is inclined to the underside 14 (angle of inclination approx. 80°)

A clip head contact surface 64 adjoins on an end of the hook offset section 58 facing away from the hook groove 59. This clip head contact surface comprises several sections 64a, 64b. With respect to the function of the sections 64a, 64b, reference is made to explanations below.

The clip head contact surface 64 is adjoined by a locking groove 71 with a locking surface 72. The locking surface 72 is slightly inclined to the top side 13. It is thus configured to be substantially parallel to the top side 15. However, the angle of inclination between the locking surface 72 and the top side 13 can be greater than shown in FIG. 1, for example, 45°.

Figure 2A:
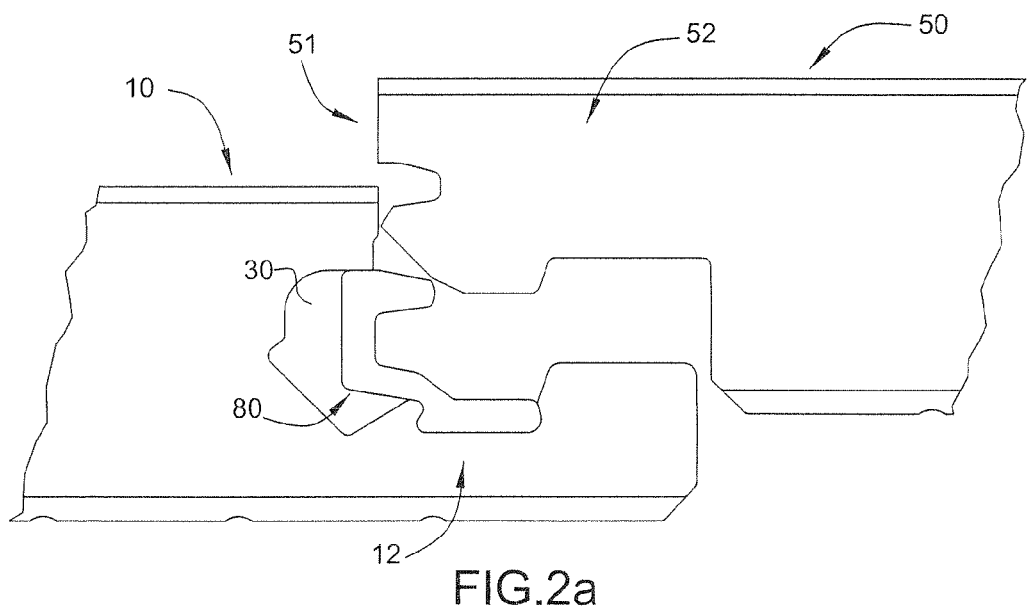
Figure 2B:
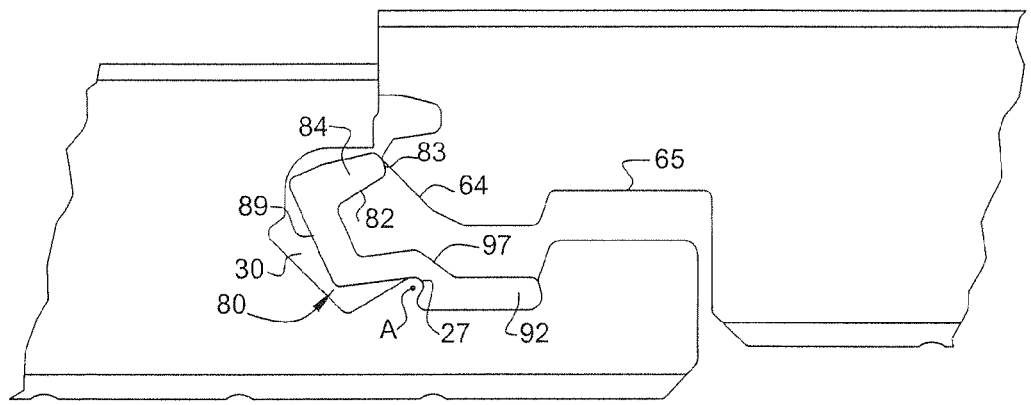
Figure 2C:
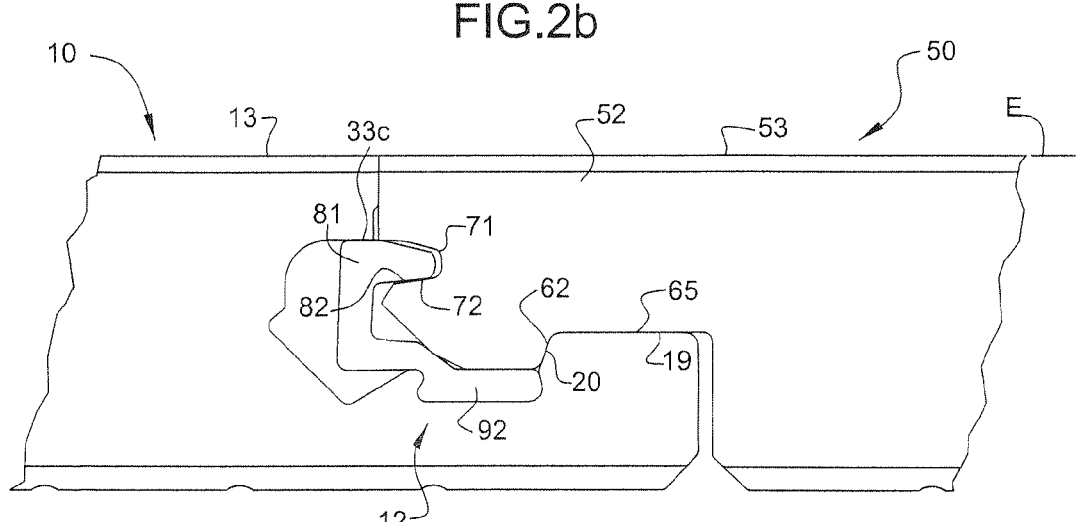

FIG. 1 shows the retaining profiles 12, 52 in a non-connected state. FIG. 2, which consists of the FIGS. 2a, 2b and 2c, shows different positions of the panels 10, 50. In FIG. 2c, the top sides 13, 53 of the panels 10, 50 lie in a common plane. This common plane can also be referred to as the plane of laying E. It can be seen, in synopsis with the FIGS. 2a and 2b, that the retaining profiles 12, 50 can be connected by a lowering movement of the second panel 50, with the lowering movement being directed perpendicular to the plane of laying E. If the panels 10, 50 are floor panels, the plane of laying E is horizontal. The retaining profiles can thus be connected with each other by means of a vertical relative movement. This vertical relative movement can also be a tilting movement of the second panel 50. In this case, the second retaining profile 50 is rotated or angled about a tilting axis extending perpendicular to the edge 51 and parallel to the plane of laying E.

During the lowering movement of the second panel 50, the clip head 81 is pressed into the clip evasion groove 30 by the clip head contact surface 64. In the process, the clip head 81 and the clip body 89 connected with the clip head execute a movement which substantially corresponds to a rotary movement about an axis of rotation A. This axis of rotation A, which extends into the plane of the illustration in FIG. 2, is substantially defined by the rotation support 27. During the movement of the clip head 81 into the clip evasion groove 30, the deformation region 97 between the fixed clip base 92 and the moving clip body 89 is deformed. Thus, the clip 80 absorbs deformation energy; the clip is therefore tensioned. At least the deformation region is made of an elastic material. Preferably, the clip is configured in one piece and can be an extruded part.

When the clip head 81 has reached, with the tip 83 of its head, the point as it is shown in FIG. 2b, the clip has absorbed its maximum deformation energy. In the case of a continued lowering movement of the second panel 50, the clip head 83 slides past the second section 64b of the clip head contact surface 64, whereby the tension in the clip 80 decreases slightly and the clip head executes a rotary movement out from the clip evasion groove 30. Ultimately, the clip head 81 snaps into the locking groove 71.

In the connected state of the retaining profiles 12, 52, the clip head 81, with an underside 82 of the head, rests against the locking surface 72 of the locking groove 71. The clip 80 with its clip head 81, in conjunction with the locking surface 72 of the locking groove 71 and the section 33c of the groove side wall 30, thus ensures a vertical lock of the retaining profiles 12, 52 and thus, a vertical lock of the panels 10, 50. As can be seen from FIG. 2c, the offset section locking surfaces 20, 62 rest against each other in the connected state of the retaining profiles 12, 52. They ensure a horizontal lock of the retaining profiles 12, 50 or a lock parallel to the top sides 13, 53. In the connected state of the retaining profiles 12, 52, the second retaining profile 52 rests on the offset section top side 19 of the hook 17 with a groove bottom 65 of the hook groove 59. Thus, the top sides 13, 53 can be brought exactly into a single plane. Thus, a small gap can remain between the clip base 92 and the hook offset section 58 of the hook 57 of the second retaining profile 52. Thus, the clip base is touched at no point in time by the second retaining profile while the retaining profiles 12, 52 are joined into one another. The deformation of the clip 80 during the lowering of the second retaining profile 50 is thus initiated exclusively by the clip head 81. Because of the restoring force caused by the deformation, the clip head moves back again.

The retaining profiles 12, 52 can be designed such that, by resting the offset section locking surfaces 20, 62 against them, a certain pressure is generated between the fitting edges 28, 70 of the retaining profiles 12, 52. However, the retaining profiles can also be designed such that a small clearance is provided between the fitting edges 28, 70.

Figure 3A:
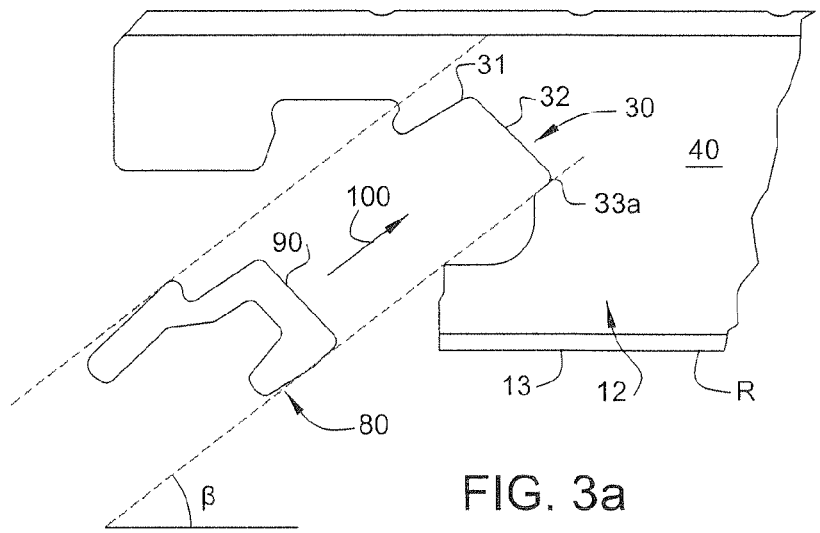
Figure 3B:
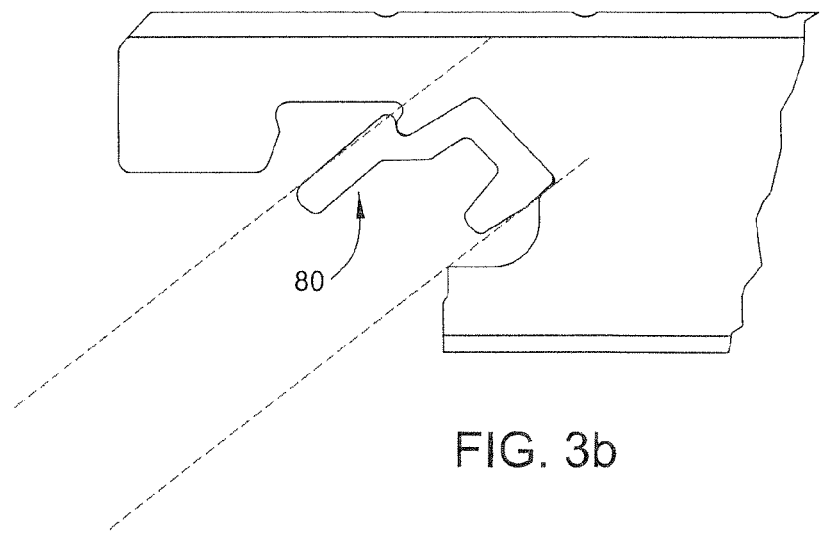
Figure 3C:
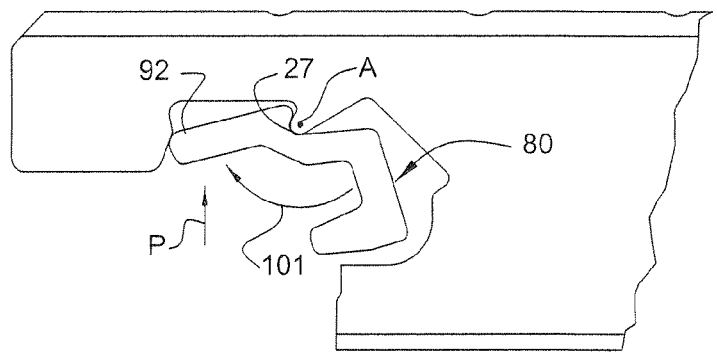

The FIGS. 3a to 3b show a method for inserting a clip 80 into the first retaining profile 12. Attention must be paid to the top side 13 of the first panel resting on a reference support R, i.e., that it lies on its head, when the clip 80 is inserted.

The clip 80 is first pushed into the clip evasion groove 30 by means of a translational movement represented by the arrow 100. In this case, the angle of inclination of this translational movement to the top side 13 is about 35°. It may, however, assume other values of between, for example, 20° and 50°. Preferably, it is not necessary to deform the clip during the translational movement into the clip evasion groove.

FIG. 3b shows the clip 80 in an intermediate insertion position. In this intermediate insertion position, the clip 80, with a rear side 90 of the body, rests against the groove rear wall 32. The clip 80, by being designed accordingly, can be clamped slightly between the lower groove side wall 31 and the first section 33a of the upper groove side wall 33. In this case, the clip body 89 and also the clip head 81 fill a groove clearance space 37, which the clip head 81 and the clip body 89 do not dip into when the clip 80 is in its laying position (see FIG. 2) with a fixed clip base 92 and the retaining profiles 12, 52 are connected with each other. The proportion of the groove clearance space in the entire clip evasion groove 30 is not inconsiderable. If the clip evasion groove is limited by its groove walls 31, 32 and 33 and an imaginary extension of the fitting edge 28, then the proportion of the clip evasion groove not required by the movement of the clip 30 during the connection of the retaining profiles can be more than 10%, 20% or 25%.

From the intermediate insertion position as shown in FIG. 3b, the clip 80 is rotated about the axis A defined by the rotation support 27. This rotation out from the clip evasion groove 30 is effected by pressure on the clip base 92. This pressure, which is marked by the arrow P in the FIG. 3c, ensures that the clip 80 is pressed from the intermediate insertion position into the laying position, in which the clip base 92 is lodged in the clip base groove 23.

Due to the twin-stage method for inserting the clip (first, translational movement until an intermediate insertion position is reached, then a rotation into the final laying position), it is possible to insert the clip into a complex retaining profile. The clip is fastened to the first retaining profile preferably exclusively via the base.

The invention claimed is:

1. A set of panels comprising:
a first panel and at least a second panel with, in each case, a top side and an underside,
wherein the first panel comprises at an edge a first retaining profile with a hook directed towards the top side of the first panel, and with a support portion comprising a pivot axis;
wherein the second panel comprises at an edge a second retaining profile with a hook directed towards the underside of the second panel;
wherein the first retaining profile and the second retaining profile are configured to connect to each other by a vertical relative movement directed perpendicular to a plane of laying;
wherein a separate clip is provided, which comprises a clip head, a clip body and a clip base, the clip base being located at a lower side of the clip body and the clip head being located at an upper side of the clip body, and the clip further comprising a deformation region disposed between the clip body and the clip base,
wherein the hooks, in a connected state of the retaining profiles, provide for a positive fit in the direction parallel to the plane of laying, and the clip provides for a positive fit in the direction perpendicular to the plane of laying, and
wherein at least a portion of the clip body is configured to engage and rotate about the support portion between an opening position and an opposing locking position during the vertical relative movement of the first and second panels, such that a portion of the clip rotates independently from the first panel,
wherein the clip base is firmly connected with the first retaining profile in a laying position of the clip, and
wherein rotary movement of the clip is carried out by a rotation of the clip body and the clip head around the deformation region.

2. The set according to claim 1, wherein the clip base is positioned in a clip base groove open towards the top side of the first panel.

3. The set according to claim 2, wherein the clip base groove comprises at least one groove side wall with an undercut, which cooperates with an outer end of the clip base.

4. The set according to claim 2 or 3, wherein the support portion is disposed in an upper end of an inner groove side wall of the clip base groove.

5. The set according to claim 4, wherein the inner groove side wall has an undercut.

6. The set according to claim 1, wherein the first retaining profile comprises a clip evasion groove, and wherein the clip evasion groove has a groove clearance space in which the clip head and the clip body are lodged when the clip is in an intermediate insertion position, in which the clip base protrudes at least partially from the clip base groove.

7. The set according to claim 6, wherein the clip is rotatable about the support portion from the intermediate insertion position into the laying position, in which the clip base is firmly connected with the first retaining profile.

8. The set according to claim 2, wherein the clip base is fixedly positioned in the clip base groove.

9. The set according to claim 1, wherein the deformation region is disposed adjacent to the support portion of the first retaining profile.

* * * * *